(12) United States Patent
Guo et al.

(10) Patent No.: US 10,530,656 B2
(45) Date of Patent: Jan. 7, 2020

(54) TRAFFIC REPLICATION IN SOFTWARE-DEFINED NETWORKING (SDN) ENVIRONMENTS

(71) Applicant: Nicira, Inc., Palo Alto, CA (US)

(72) Inventors: Fei Guo, Beijing (CN); Jingchun Jiang, Beijing (CN)

(73) Assignee: NICIRA, INC., Palo Alto, CA (US)

( * ) Notice: Subject to any disclaimer, the term of this patent is extended or adjusted under 35 U.S.C. 154(b) by 162 days.

(21) Appl. No.: 15/879,447

(22) Filed: Jan. 25, 2018

(65) Prior Publication Data

US 2019/0123962 A1 Apr. 25, 2019

Related U.S. Application Data

(60) Provisional application No. 62/574,208, filed on Oct. 19, 2017.

(51) Int. Cl.
*H04L 29/08* (2006.01)
*H04L 12/24* (2006.01)
*H04L 12/46* (2006.01)

(52) U.S. Cl.
CPC ...... *H04L 41/0893* (2013.01); *H04L 12/4633* (2013.01); *H04L 41/12* (2013.01); *H04L 41/20* (2013.01)

(58) Field of Classification Search
CPC .................................................. H04L 67/1095
See application file for complete search history.

(56) References Cited

U.S. PATENT DOCUMENTS

2011/0252124 A1* 10/2011 Bonner ............... H04L 67/1095
709/224
2013/0031051 A1* 1/2013 Mujumdar ............ G06F 16/273
707/626

\* cited by examiner

*Primary Examiner* — Ayanah S George
(74) *Attorney, Agent, or Firm* — SU IP Consulting

(57) ABSTRACT

An example method for a first host to perform traffic replication in a software-defined networking (SDN) environment may include obtaining control information that includes a first identifier associated with a first replication domain to which the first host and a second host are assigned, and a second identifier associated with a second replication domain to which a third host is assigned. In response to detecting, from a virtualized computing instance, a packet that requires replication, the method also includes, generating a first encapsulated packet by encapsulating the packet with a first outer header that includes the first identifier, generating a second encapsulated packet by encapsulating the packet with a second outer header that includes the first identifier or the second identifier, and sending the first encapsulated packet to the second host, and the second encapsulated packet to third host to cause the third host to perform replication within the second replication domain.

21 Claims, 9 Drawing Sheets

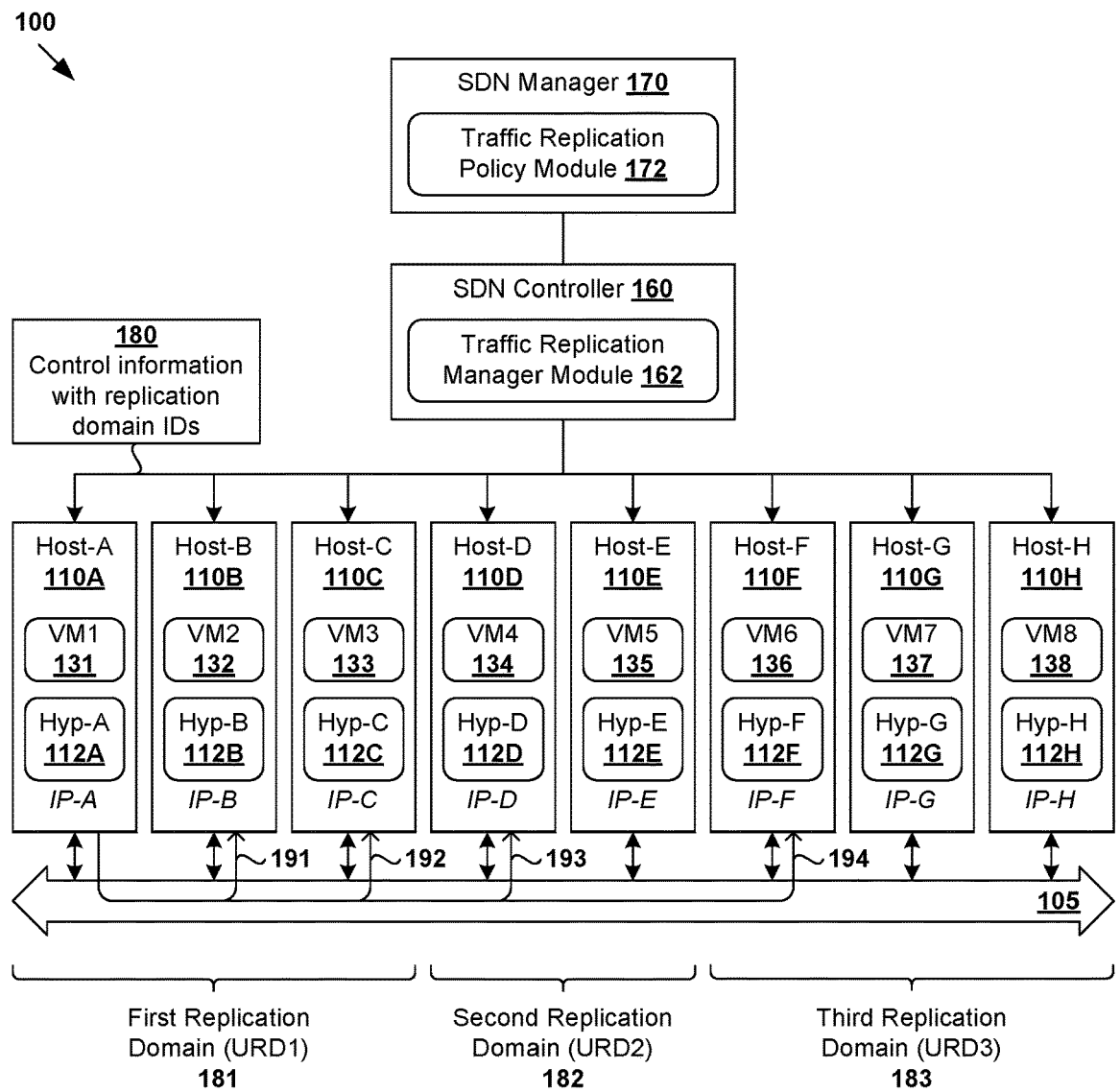
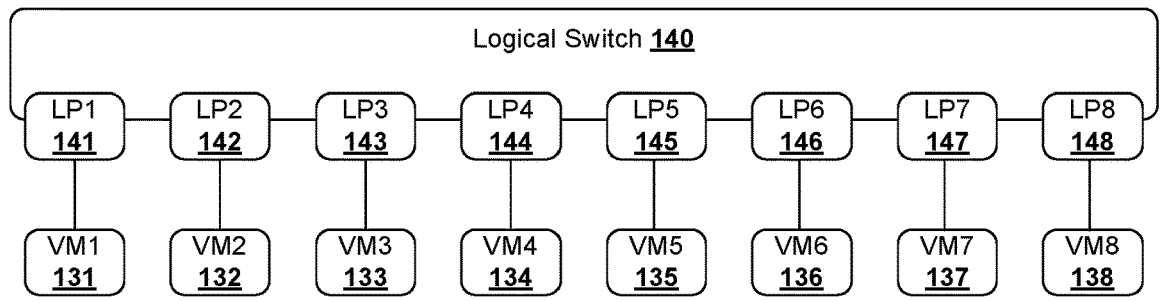
Fig. 1

500

| ID(URD) | VTEP IP | RTEP?* | |
|---|---|---|---|
| ID(URD1) = 10 | IP-A = 10.20.10.10 (First subnet) | YES | ~510 |
| ID(URD1) = 10 | IP-B = 10.30.10.10 (Second subnet) | NO | ~520 |
| ID(URD1) = 10 | IP-C = 10.20.10.11 (First subnet) | NO | ~530 |
| ID(URD2) = 20 | IP-D = 10.20.10.12 (First subnet) | YES | ~540 |
| ID(URD2) = 20 | IP-E = 10.20.10.13 (First subnet) | NO | ~550 |
| ID(URD3) = 30 | IP-F = 10.40.10.10 (Third subnet) | YES | ~560 |
| ID(URD3) = 30 | IP-G = 10.40.10.11 (Third subnet) | NO | ~570 |
| ID(URD3) = 30 | IP-H = 10.40.10.12 (Third subnet) | NO | ~580 |

*RTEP selected by network management entity or host*

☐▨ : Egress packet 710 / Decapsulated packet 725/735/745/755/765/775/776/785

| 712 Inner header (I)<br>Source: VM IP = IP-1, MAC = MAC-1<br>Destination: IP = IP-BUM, MAC-BUM | 714<br>Payload |
|---|---|

☐☐▨ : Encapsulated packet 720 (host-A in URD1 to host-D in URD2)

| 722 Outer header (O)<br>Source VTEP: IP-A, MAC-A<br>Destination RTEP: IP-D, MAC-D<br>Logical overlay network: 5001 | 724<br>ID(URD)<br>= 10 | 726<br>Replicate<br>flag = 1 | 712<br>Inner<br>header (I) | 714<br>Payload |
|---|---|---|---|---|

☐☐▨ : Encapsulated packet 730 (host-A in URD1 to host-F in URD3)

| 732 Outer header (O)<br>Source VTEP: IP-A, MAC-A<br>Destination RTEP: IP-F, MAC-F<br>Logical overlay network: 5001 | 734<br>ID(URD)<br>= 10 | 736<br>Replicate<br>flag = 1 | 712<br>Inner<br>header (I) | 714<br>Payload |
|---|---|---|---|---|

☐☐▨ : Encapsulated packet 740 (host-A to host-B in URD1)

| 742 Outer header (O)<br>Source VTEP: IP-A, MAC-A<br>Destination VTEP: IP-B, MAC-B<br>Logical overlay network: 5001 | 744<br>ID(URD)<br>= 10 | 746<br>Replicate<br>flag = 0 | 712<br>Inner<br>header (I) | 714<br>Payload |
|---|---|---|---|---|

☐☐▨ : Encapsulated packet 750 (host-A to host-C in URD1)

| 752 Outer header (O)<br>Source VTEP: IP-A, MAC-A<br>Destination VTEP: IP-C, MAC-C<br>Logical overlay network: 5001 | 754<br>ID(URD)<br>= 10 | 756<br>Replicate<br>flag = 0 | 712<br>Inner<br>header (I) | 714<br>Payload |
|---|---|---|---|---|

☐☐▨ : Encapsulated packet 750 (host-D to host-E in URD2)

| 762 Outer header (O)<br>Source VTEP: IP-D, MAC-D<br>Destination VTEP: IP-E, MAC-E<br>Logical overlay network: 5001 | 764<br>ID(URD)<br>= 10 | 766<br>Replicate<br>flag = 0 | 712<br>Inner<br>header (I) | 714<br>Payload |
|---|---|---|---|---|

☐☐▨ : Encapsulated packet 770 (host-F to host-G in URD3)

| 772 Outer header (O)<br>Source VTEP: IP-F, MAC-F<br>Destination VTEP: IP-G, MAC-G<br>Logical overlay network: 5001 | 774<br>ID(URD)<br>= 10 | 776<br>Replicate<br>flag = 0 | 712<br>Inner<br>header (I) | 714<br>Payload |
|---|---|---|---|---|

☐☐▨ : Encapsulated packet 780 (host-F to host-H in URD3)

| 782 Outer header (O)<br>Source VTEP: IP-F, MAC-F<br>Destination VTEP: IP-H, MAC-H<br>Logical overlay network: 5001 | 784<br>ID(URD)<br>= 10 | 786<br>Replicate<br>flag = 0 | 712<br>Inner<br>header (I) | 714<br>Payload |
|---|---|---|---|---|

Fig. 8

TRAFFIC REPLICATION IN SOFTWARE-DEFINED NETWORKING (SDN) ENVIRONMENTS

CROSS-REFERENCE TO RELATED APPLICATION

The present application claims the benefit of U.S. Provisional Application No. 62/574,208, filed Oct. 19, 2017, which is incorporated herein by reference in its entirety.

BACKGROUND

Unless otherwise indicated herein, the approaches described in this section are not admitted to be prior art by inclusion in this section.

Virtualization allows the abstraction and pooling of hardware resources to support virtual machines in a Software-Defined Networking (SDN) environment, such as a Software-Defined Data Center (SDDC). For example, through server virtualization, virtual machines running different operating systems may be supported by the same physical machine (e.g., referred to as a "host"). Each virtual machine is generally provisioned with virtual resources to run an operating system and applications. The virtual resources may include central processing unit (CPU) resources, memory resources, storage resources, network resources, etc.

Through SDN, benefits similar to server virtualization may be derived for networking services. For example, logical overlay networks that are decoupled from the underlying physical network infrastructure may be provided. The logical overlay networks may be provisioned, changed, stored, deleted and restored programmatically without having to reconfigure the underlying physical hardware architecture, thereby improving network utilization and facilitating configuration automation. In practice, traffic replication may be performed by a host in the SDN environment when handling broadcast, unknown unicast and multicast (BUM) traffic, etc. However, traffic replication generally creates a lot of burden on the computing and network resources in the SDN environment.

BRIEF DESCRIPTION OF DRAWINGS

FIG. 1 is a schematic diagram illustrating an example software-defined networking (SDN) environment in which traffic replication may be performed;

FIG. 5 is a schematic diagram of example control information for traffic replication in an SDN environment;

FIG. 8 is a schematic diagram illustrating example packets in FIG. 7; and

DETAILED DESCRIPTION

Figure 2:
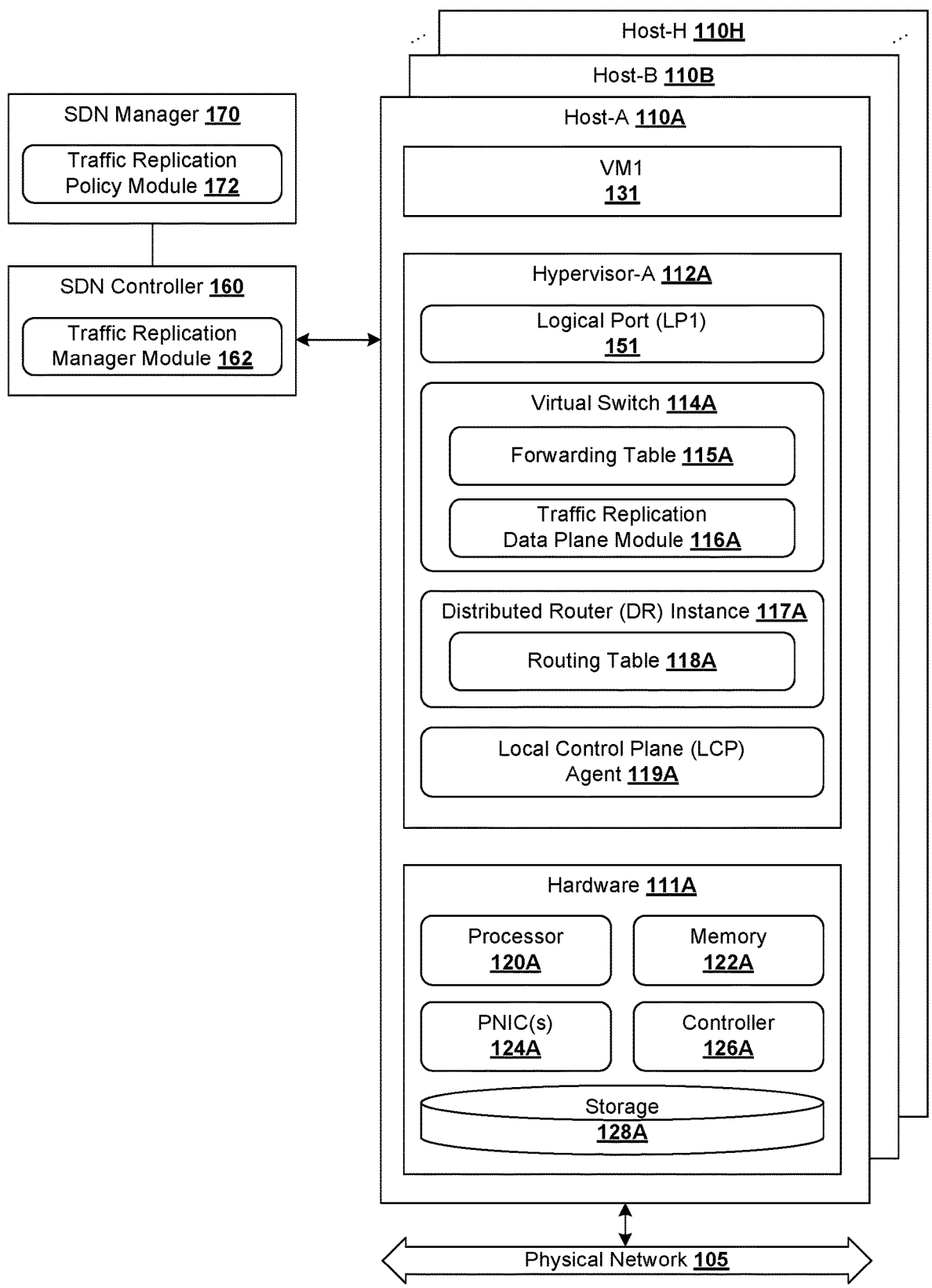
FIG. 2 is a schematic diagram illustrating example hosts that are configured to perform traffic replication in an SDN environment.

In the following detailed description, reference is made to the accompanying drawings, which form a part hereof. In the drawings, similar symbols typically identify similar components, unless context dictates otherwise. The illustrative embodiments described in the detailed description, drawings, and claims are not meant to be limiting. Other embodiments may be utilized, and other changes may be made, without departing from the spirit or scope of the subject matter presented here. It will be readily understood that the aspects of the present disclosure, as generally described herein, and illustrated in the drawings, can be arranged, substituted, combined, and designed in a wide variety of different configurations, all of which are explicitly contemplated herein.

Challenges relating to traffic replication will now be explained in more detail using FIG. 1 and FIG. 2. In particular, FIG. 1 is a schematic diagram illustrating example software-defined networking (SDN) environment 100 in which traffic replication may be performed. FIG. 2 is a schematic diagram illustrating example hosts 110A-H that are configured to perform traffic replication in SDN environment 100. It should be understood that, depending on the desired implementation, SDN environment 100 may include additional and/or alternative components than that shown in FIG. 1 and FIG. 2. In practice, SDN environment 100 may include any number of hosts (also known as a "computing devices", "host computers", "host devices", "physical servers", "server systems", "transport nodes," etc.). Each host may be supporting any number of virtual machines (e.g., tens or hundreds).

In the example in FIG. 1, two different views of the same SDN environment 100 are shown. Physical view 101 represents a physical implementation of various virtual machines 131-138 in SDN environment 100, while logical view 102 (also known as a management plane view) represents how virtual machines 131-138 are represented internally and connected. Referring first to physical view 101, SDN environment 100 includes multiple hosts 110A-H that are inter-connected via physical network 105. Hosts 110A-H each include suitable hardware and virtualization software (e.g., hypervisors 112A-H) to support respective virtual machines 131-138. For example, host-A 110A supports VM1 131; host-B 110B supports VM2 132; host-C 110C supports VM3 133, host-D 110D supports VM4 134, host-E 110E supports VM5 135, host-F 110F supports VM6 136, host-G 110G supports VM7 137, and host-H 110H supports VM8 138.

Referring also to FIG. 2, hosts 110A-H may include any suitable component(s). Using host-A 110A as an example, hypervisor 112A (labelled as "Hyp-A" in FIG. 1) maintains a mapping between underlying hardware 111A and virtual resources allocated to virtual machines such as VM1 131. Hardware 111A includes suitable physical components, such as central processing unit(s) or processor(s) 120A; memory 122A; physical network interface controllers (NICs) 124A; and storage disk(s) 128A/accessible via storage controller(s) 126A, etc. Virtual resources are allocated to each virtual machine to support a guest operating system (OS) and applications. For example, corresponding to hardware 111A, the virtual resources may include virtual CPU, virtual memory, virtual disk, virtual network interface controller (VNIC), etc.

Hypervisor 112A further implements virtual switch 114A and logical distributed router (DR) instance 115A to handle egress packets from, and ingress packets to, virtual machines such as VM1 131. In practice, logical switches and logical distributed routers may be implemented in a distributed manner and can span multiple hosts 110A-H to connect virtual machines 131-138. Referring also to logical view 102 in FIG. 1, logical switch 140 is configured to provide logical layer-2 connectivity to virtual machines 131-138. Logical switch 140 may be implemented collectively by virtual switches of respective hosts 110A-H and represented internally using forwarding tables at the respective virtual switches. For example at host-A 110A, logical switch 140 may be implemented using an entry in forwarding table 115A. Further, logical distributed routers that provide logical layer-3 connectivity may be implemented collectively by DR instances (e.g., 117A) of respective hosts 110A-H and represented internally using routing tables (e.g., 118A) at the respective DR instances. The routing tables may be each include entries that collectively implement the respective logical distributed routers.

Virtual machines 131-138 send and receive packets via respective logical ports 141-148. As used herein, the term "logical port" may refer generally to a port on a logical switch to which a virtualized computing instance is connected. A "logical switch" (e.g., 140) may refer generally to an SDN construct that is collectively implemented by virtual switches of hosts 110A-H, whereas a "virtual switch" (e.g., 114A) may refer generally to a software switch or software implementation of a physical switch. In practice, there is usually a one-to-one mapping between a logical port on a logical switch and a virtual port on a virtual switch. However, the mapping may change in some scenarios, such as when the logical port is mapped to a different virtual port on a different virtual switch after migration of the corresponding virtualized computing instance (e.g., when the source and destination hosts do not have a distributed virtual switch spanning them).

Although examples of the present disclosure refer to virtual machines, it should be understood that a "virtual machine" running on a host is merely one example of a "virtualized computing instance" or "workload." A virtualized computing instance may represent an addressable data compute node or isolated user space instance. In practice, any suitable technology may be used to provide isolated user space instances, not just hardware virtualization. Other virtualized computing instances may include containers (e.g., running within a VM or on top of a host operating system without the need for a hypervisor or separate operating system or implemented as an operating system level virtualization), virtual private servers, client computers, etc. Such container technology is available from, among others, Docker, Inc. Example containers will be discussed further using FIG. 9. The virtual machines may also be complete computational environments, containing virtual equivalents of the hardware and software components of a physical computing system.

As used herein, the term "hypervisor" may refer generally to a software layer or component that supports the execution of multiple virtualized computing instances, including system-level software in guest virtual machines that supports namespace containers such as Docker, etc. The term "packet" may refer generally to a group of bits that can be transported together from a source to a destination, such as message, segment, datagram, etc. The term "traffic" may refer generally to one or more packets. The term "layer-2" may refer generally to a Media Access Control (MAC) layer; "layer-3" to a network or Internet Protocol (IP) layer; and "layer-4" to a transport layer (e.g., using transmission control protocol (TCP) or user datagram protocol (UDP)) in the Open System Interconnection (OSI) model, although the concepts described herein may be used with other networking models.

SDN environment 100 further includes SDN controller 160 and SDN manager 170 are example network management entities that facilitate implementation of software-defined (e.g., logical overlay) networks. One example of an SDN controller is the NSX controller component of VMware NSX® (available from VMware, Inc.) that operates on a central control plane (also referred as "control plane"). SDN controller 160 may be a member of a controller cluster (not shown for simplicity) that is configurable using SDN manager 170 operating on a management plane. Network management entity 160/170 may be implemented using physical machine(s), virtual machine(s), or both. Logical switches, logical routers, and logical overlay networks may be configured using SDN controller 160, SDN manager 170, etc.

A logical overlay network (also known as "logical network") may be formed using any suitable tunneling protocol, such as Virtual eXtensible Local Area Network (VXLAN), Stateless Transport Tunneling (STT), Generic Network Virtualization Encapsulation (GENEVE), etc. For example, VXLAN is a layer-2 overlay scheme on a layer-3 network that uses tunnel encapsulation to extend layer-2 segments across multiple hosts. In the example in FIG. 1, virtual machines 131-138 supported by respective hosts 110A-H are located on the same logical layer-2 segment, i.e., VXLAN segment with VXLAN network identifier (VNI) =5001. Note that the terms "logical overlay network" and "logical layer-2 segment" may be used interchangeably.

Hosts 110A-H may maintain data-plane connectivity with each other to facilitate communication among virtual machines 131-138. For example, hypervisor 112A-H may each implement a virtual tunnel endpoint (VTEP) to encapsulate and decapsulate packets with an outer header (also known as a tunnel header) identifying the relevant logical overlay network (e.g., VNI=5001). This way, hypervisors 112A-H may "participate" in the logical overlay network and handle traffic to and from virtual machines 131-138. For example in FIG. 1 and FIG. 2, hypervisor-A 112A implements VTEP-A with IP address=IP-A, hypervisor-B 112B implements VTEP-B with IP-B, hypervisor-C 112C implements VTEP-C with IP-C, and so on. Encapsulated packets may be sent via an end-to-end, bi-directional communication path (known as a tunnel) established between a pair of VTEPs over physical network 105. In practice, each host may support multiple VTEPs associated with different logical overlay networks.

In practice, traffic replication is performed in SDN environment 100 when, for example, handling broadcast, unknown unicast and multicast (BUM) packets. One type of broadcast traffic is address resolution traffic. In practice, address resolution refers to the process of resolving a protocol address (e.g., IP address) to a hardware address (e.g., MAC address). For example, address resolution may be required when a source wishes to communicate with a destination. To learn the hardware address of the destination, the source broadcasts a address resolution request that includes a known protocol address of the destination. In response, the destination will send a response that includes its hardware address. Other recipients are not required to respond to the broadcasted request message. For example in FIG. 1, consider the communication between a pair of virtual machines, such as VM1 131 on host-A 110A and VM3 133 on host-C 110C. To communicate with VM3 133, VM1 131 finds out the MAC address of VM3 133 by broadcasting an address resolution request within logical network=VXLAN5001 to translate IP address=IP-3 of VM3 133.

Conventionally, host-A 110A performs replication by sending the address resolution request to other hosts 110B-H supporting respective virtual machines 132-138 connected to logical switch 140. For example, to reach VM2 132 on host-B 110B, host-A 110A generates an encapsulated packet by encapsulating the ARP request with an outer header addressed to host-B 110B. To reach VM3 133 on host-C 110C, host-A 110A generates another encapsulated packet by encapsulating the ARP request with an outer header addressed to host-C 110C. This is repeated for host-D 110D, host-E 110E, host-F 110F, host-G 110G and host-H 110H. Once VM3 133 responds, VM1 131 caches the MAC address=MAC-3 of VM3 133 in a table entry, which expires if VM1 131 does not communicate with VM3 133 within a predefined period of time. After the table entry expires, VM1 131 will have to repeat the above process to relearn the MAC address of VM3 133. The address resolution process may be performed by other virtual machines in a similar manner.

The above conventional approach is undesirable because, inter alia, it creates a burst of traffic that may overload the resources of host-A 110A and physical network 105. For example, hardware resources (e.g., physical NIC(s) 124A) may be overloaded when host-A 110A generates and sends replicated traffic to a large number of hosts. This also adversely affects the performance of other virtual machines (not shown for simplicity) supported by host-A 110A, as well as that of other users of physical network 105. These problems are exacerbated when a particular source host supports a large number of virtual machines and/or there are tens and hundreds of destination hosts to which traffic is replicated. Similar problems are observed for multicast and unknown unicast traffic.

Replication Domains

According to examples of the present disclosure, traffic replication may be improved by assigning hosts 110A-H to various replication domains 181-183. The term "replication domain" may refer generally to a group of one or more hosts (each supporting a VTEP) to which traffic is replicated, thereby limiting the scope of traffic replication in SDN environment 100. This improves scalability and efficiency of traffic replication, especially when there is a large number of hosts in SDN environment 100. As will be discussed further below, traffic replication may be performed without necessitating host-A 110A to send encapsulated packets to every other host in FIG. 1.

Figure 3:
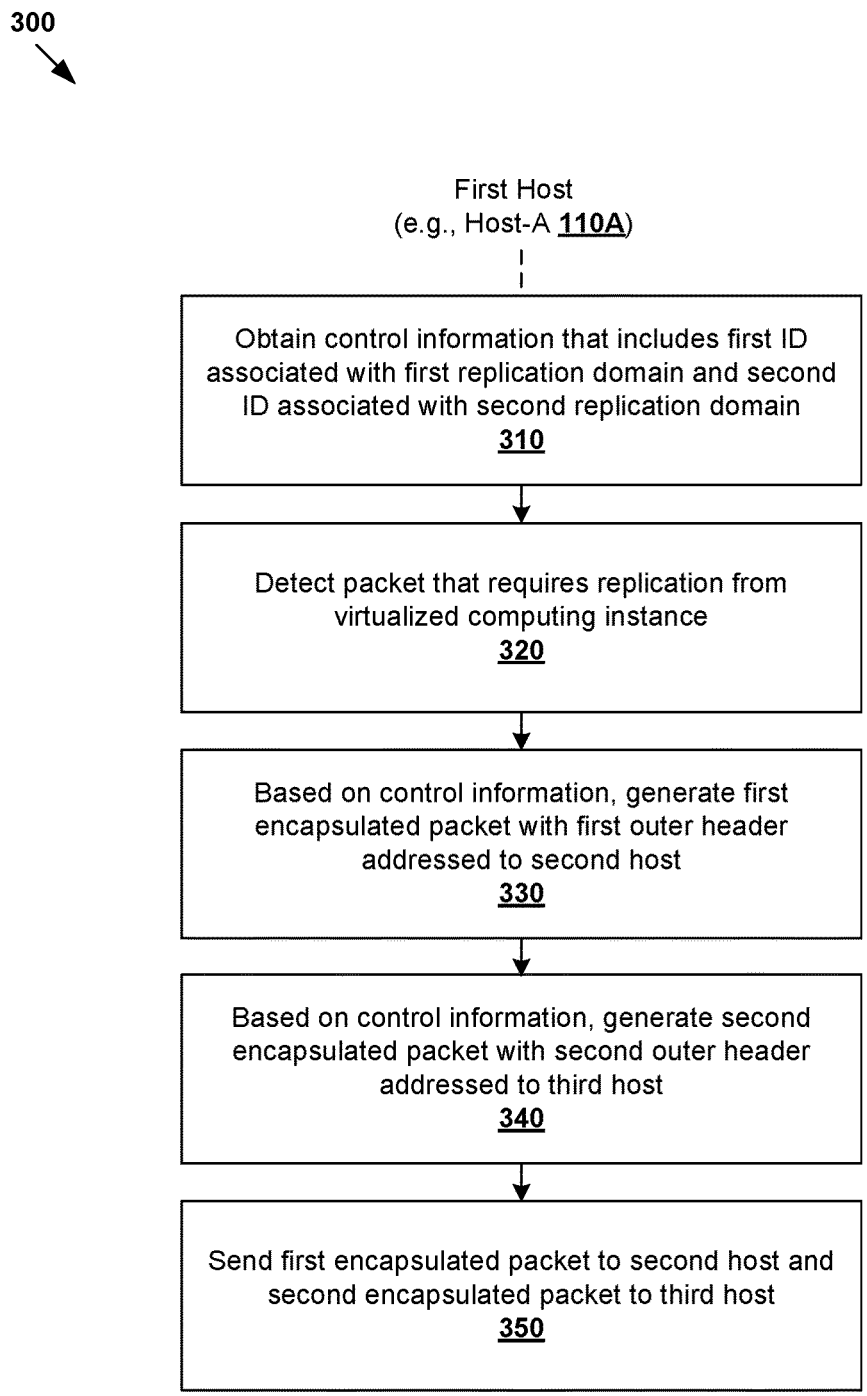
FIG. 3 is a flowchart of an example process for a first host to perform traffic replication in an SDN environment.

In more detail, FIG. 3 is a flowchart of example process 300 for a first host to perform traffic replication in SDN environment 100. Example process 300 may include one or more operations, functions, or actions illustrated by one or more blocks, such as 310 to 350. The various blocks may be combined into fewer blocks, divided into additional blocks, and/or eliminated depending on the desired implementation. Example process 300 may be implemented using hosts 110A-H, such as using respective hypervisors 112A-H or more particularly traffic replication modules (e.g., 116A), etc.

At 310 in FIG. 3, a first host may obtain control information that includes a first identifier associated with a first replication domain to which the first host and a second host are assigned, and a second identifier associated with a second replication domain to which a third host is assigned. At 320, 330 and 340, in response to detecting a packet that requires replication, the first host may generate a first encapsulated packet and a second encapsulated packet. The first encapsulated packet may be generated by encapsulating the packet with a first outer header that is addressed to second host and includes the first identifier. The second encapsulated packet may be generated by encapsulating the packet with a second outer header that is addressed to the third host and includes the first identifier or the second identifier. At 350, the first encapsulated packet may be sent to the second host, and the second encapsulated packet to the third host to cause the third host to perform replication within the second replication domain.

Some examples will be explained with FIG. 1, particularly using host-A 110A as an example "first host," host-B 110B and host-C 110C as "second hosts," host-D 110D as a "third host," VM1 131 as a "virtualized computing instance," and SDN controller 160 as a "network management entity." In this case, host-A 110A may obtain control information 180 that includes a first identifier associated with first replication domain 181 to which host-A 110A as well as host-B 110B and host-C 110C are assigned. Control information may also include a second identifier associated with second replication domain 182 to which host-D 110D and host-E 110E are assigned. Here, the term "obtain" may refer generally to host-A 110A receiving control information 180 from SDN controller 160 (e.g., configured to perform replication domain assignments) or any other suitable source, retrieving from local or remote storage, etc.

In response to detecting a packet from VM1 131 that requires replication on a logical overlay network (e.g., VXLAN5001), host-A 110A generates and sends encapsulated packets to host-B 110B (see 191) and host-C 110C (see 192), respectively. Further, host-A 110A generates and sends an encapsulated packet to host-D 110D (see 193) to cause host-D 110D to perform replication within second replication domain 182. This way, it is not necessary for host-A 110A to send any encapsulated packet to host-E 110E in second replication domain 182.

In practice, any suitable number of replication domains may be configured in SDN environment 100. For example in FIG. 1, host-F 110F, host-G 110G and host-H 110H may be assigned to third replication domain 183. In this case, host-A 110A generates and sends an encapsulated packet to host-F 110F (see 194) to cause host-F 110F to perform replication within third replication domain 183. This way, it is not necessary for host-A 110A to send any encapsulated packet to host-G 110G and host-H 110H in third replication domain 183. As the number of virtual machines that are located on the same logical overlay network and/or hosts supporting those virtual machines increases, additional replication domains may be configured.

According to examples of the present disclosure, the flexibility of replication domain assignment may be improved using identifiers to identify various replication domains 181-183. In this case, hosts assigned to the same replication domain may be associated with the same VTEP IP subnet, or different VTEP IP subnets. In the example in FIG. 1, host-A 110A and host-C 110C assigned to first replication domain 181 may be associated with respective VTEP IP addresses that belong to the same IP subnet (e.g., both IP-A and IP-C in 10.20.10.0/24). On the other hand, host-B 110B may be associated with a different VTEP IP subnet (e.g., IP-B in 10.30.10.0/24).

Additionally or alternatively, hosts associated with the same VTEP IP subnet may be assigned to different replication domains. In the example in FIG. 1, host-D 110D and host-E 110E assigned to second replication domain 182 may be associated with the same VTEP IP subnet (e.g., 10.20.10.0/24) as host-A 110A and host-C 110C. This way, it is not necessary to assign hosts associated with the same IP subnet to the same replication domain, which is inefficient when there is a large number of such hosts.

In the following, various examples will be discussed using FIG. 4 to FIG. 9. In particular, configuration of replication domains 181-183 will be discussed using FIG. 4 and FIG. 5, and traffic replication using FIG. 6 to FIG. 9.

Configuration of Replication Domains

Figure 4:
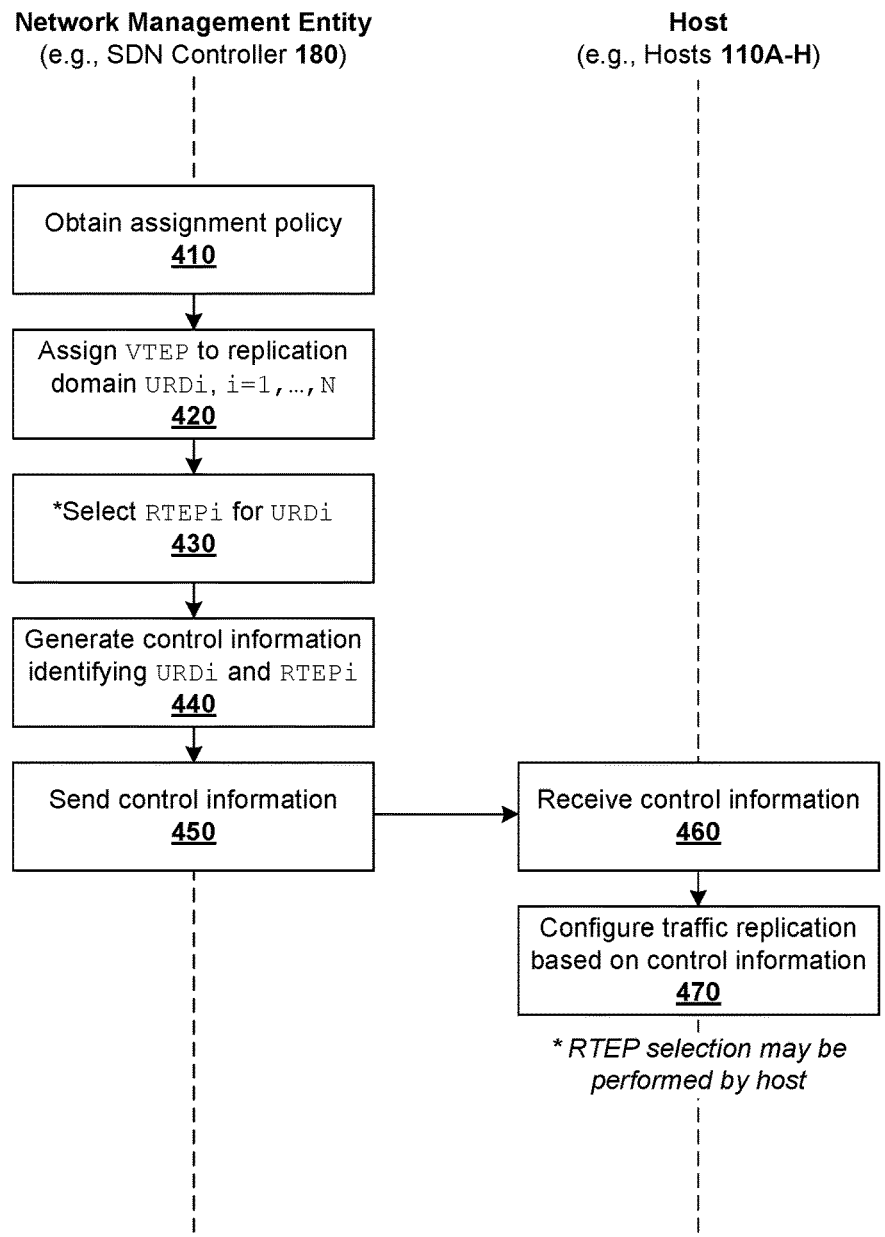
FIG. 4 is a flowchart of an example process of configuring replication domains in an SDN environment.

FIG. 4 is a flowchart of example process 400 of configuring replication domains 181-183 in SDN environment 100. Example process 400 may include one or more operations, functions, or actions illustrated at 410 to 470. The various operations, functions or actions may be combined into fewer blocks, divided into additional blocks, and/or eliminated depending on the desired implementation. In practice, blocks 410-450 may be performed by any suitable network management entity (e.g., SDN controller 160 using traffic replication manager module 162) and blocks 460-470 by hosts 110A-H.

At 410 in FIG. 4, SDN controller 160 obtains an assignment policy from any suitable source, such as from traffic replication policy module 172 implemented by SDN manager 170 on the management plane, from storage accessible by SDN controller 160, etc. Here, the term "assignment policy" may refer generally to one or more rules, criteria or filters that are applicable when assigning a host, or more particularly a VTEP implemented by the host, to a replication domain. The assignment policy may be configured by a user (e.g., network administrator) via any suitable interface provided by SDN manager 170, such as application programming interface (API), graphical user interface (GUI), command line interface (CLI), etc. Alternatively or additionally, an automated system may configure the assignment policy via the API.

Depending on the desired implementation, the assignment policy may be a static or dynamic policy that assigns a host to a particular replication domain based on the host's name; the host's location; IP address information of a VTEP implemented by the host; amount of BUM traffic generated by the host, etc. For example, a location-dependent assignment policy may assign hosts associated with the same location (e.g., chassis, rack, pod, data center, etc.) to the same replication domain. If the number of hosts located at the same location exceeds a predetermined threshold, the hosts may distributed among multiple replication domains. In practice, a chassis may refer to an enclosure in which one or more hosts are mounted (e.g., depending on the vendor's specification). A rack (e.g., server rack) may include one or more chassis stacked to make efficient use of space and position within a pod. A pod may be a modular unit of datacenter with a set of resources or infrastructure to service one or more racks. A datacenter may be a collection of hosts housed in one or more pods, racks and chassis.

In another example, the assignment policy may dynamically assign or reassign a host to a particular replication domain based on the amount of BUM traffic generated by the host over a period of time. This way, the number of replication domains configured in SDN environment 100 and the number of hosts assigned to each replication domain may be dynamically updated over time to improve or optimize traffic replication efficiency. This also improves flexibility and scalability without necessitating all member VTEPs from the same IP subnet to be assigned to the same replication domain.

At 420 in FIG. 4, based on the assignment policy, SDN controller 160 configures N replication domains (also known as unicast replication domains) and assigns a host, or more particularly a VTEP supported by the host, to a replication domain denoted as URDi, where i=1, . . . , N. Each replication domain may include VTEPs that belong to the same IP subnet, or different IP subnets. VTEPs that belong to the same IP subnet may be assigned to different replication domains. Different replication domains may have different numbers of host members. Each URDi may be associated with a unique ID that is generated by SDN controller 160 using any suitable approach.

At 430 in FIG. 4, SDN controller 160 selects a replication tunnel endpoint (RTEP) denoted as RTEPi for each replication domain URDi, where i=1, . . . , N. Here, the term "RTEP" may refer generally to a VTEP that is assigned to a particular replication domain $URD_i$ and configured to perform traffic replication within that replication domain. In practice, the selection may be made randomly, or based on any suitable criteria. The selection may be made by SDN controller 160 based on the result of an election process among member VTEPs of the same replication domain.

At 440 and 450, SDN controller 160 generates and sends control information to hosts 110A-H to configure hosts 110A-H to perform traffic replication based on the control information. Some examples will be explained using FIG. 5, which is a schematic diagram illustrating example control information 500 for traffic replication in SDN environment 100. In this example, control information 500 is generated to configure N=3 replication domains. Referring to 510, 520 and 530, VTEPs implemented by host-A 110A, host-B 110C and host-C 110C are assigned to first replication domain 181 denoted as URD1 with ID=10 (see 181 in FIG. 1). Referring to 540 and 550, VTEPs implemented by host-C 110C and host-D 110D are assigned to second replication domain 182 denoted as URD2 with ID=20. Referring to 560, 570 and 580, host-E 110E, host-F 110F and host-G 110G are assigned to third replication domain 183 denoted as URD3 with ID=30.

As exemplified in FIG. 5, VTEPs that belong different IP subnets may be assigned to the same replication domain (e.g., URD1), and VTEPs from the same IP subnet assigned to different replication domains (e.g., URD1 and URD2) or the same replication domain (e.g., URD3). In particular, in relation to URD1, host-A 110A and host-C 110C are associated with a first VTEP IP subnet=10.20.10.0/24, and host-B 110B with a different, second VTEP IP subnet=10.30.10.0/24.

In relation to URD2, host-C 110C and host-D 110D are associated with the first VTEP IP subnet (i.e., same as host-A 110A). In relation to URD3, host-E 110E, host-F 110F and host-G 110G are associated with a third VTEP IP subnet=10.40.10.0/24. Control information 500 further indicates the RTEP selected to perform traffic replication in each replication domain. For example in FIG. 5, the VTEPs implemented by respective host-A 110A in URD1 (see 510), host-D 110D in URD2 (see 540) and host-F 110F in URD3 (see 560) are selected as RTEPs.

At 460 and 470 in FIG. 4, each host configures traffic replication based on control information 500 in FIG. 5. Using host-A 110A as an example, control information 500 may be received by LCP agent 119A, which then configures virtual switch 114A, or more particularly traffic replication data plane module 116A, to perform traffic replication. Similar configuration may be performed by hosts 110B-H.

Depending on the desired implementation, the selection at block 430 in FIG. 4 may be performed by hosts 110A-H (i.e., instead of SDN controller 180). In this case, SDN controller 180 may send control information that defines the scope of each URDi to hosts 110A-H after the assignment at block 420. Using the example in FIG. 5 again, the control information may specify VTEP IP address information (IP-A, IP-B, IP-C) associated with URD1, (IP-D, IP-E) associated with URD2 and (IP-F, IP-G, IP-H) associated with URD3 (see columns labelled "ID(URD)" and "VTEP IP" in FIG. 5).

Based on the control information defining the scope of each URDi, hosts 110A-H may then select the RTEPi for URDi, where i=1, . . . , N. For example, for URD2, host-A 110A then select either host-D 110D or host-E 110E to be the RTEP. Further, for URD3, the selected RTEP may be host-F 110F, host-G 110G or host-F 110F. After the selection process, host-A 110A may then update the control information in FIG. 5 to record the selected RTEPs, such as by generating or adding the third column labelled "RTEP?" in the example in FIG. 5, etc. This way, the RTEP selection process may be performed by hosts 110A-H in a decentralized and more efficient manner.

In practice, any suitable fault tolerance mechanism may be implemented with the examples of the present disclosure. For example, when an RTEP is down or becomes non-responsive due to a fault (e.g., hardware/software fault, network fault, power fault, etc.), a new RTEP may be selected. Consider an example scenario where there is a fault associated with host-D 110D (i.e., current RTEP selected by SDN controller 180 or host-A 110A). In this case, host-A 110A may identify that host-E 110E is also assigned to URD2 based on the control information, and selects host-E 110E to be the new RTEP. Other hosts 110B-H may perform the RTEP selection and/or re-selection in a similar manner. Alternatively, the new RTEP may be selected by SDN controller 180.

Traffic Replication

Figure 6:
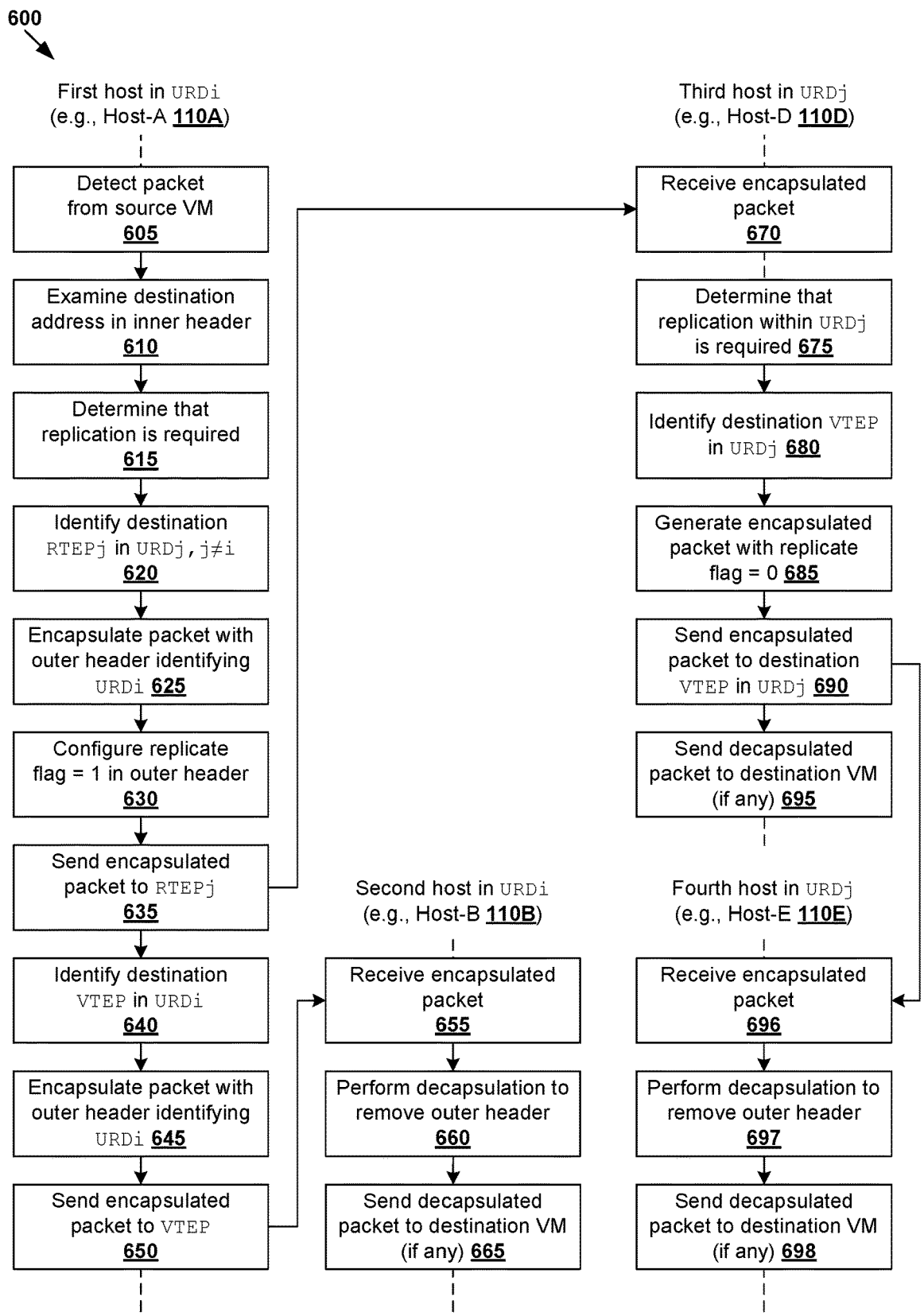
FIG. 6 is a flowchart of an example detailed process of traffic replication in an SDN environment.
Figure 7:
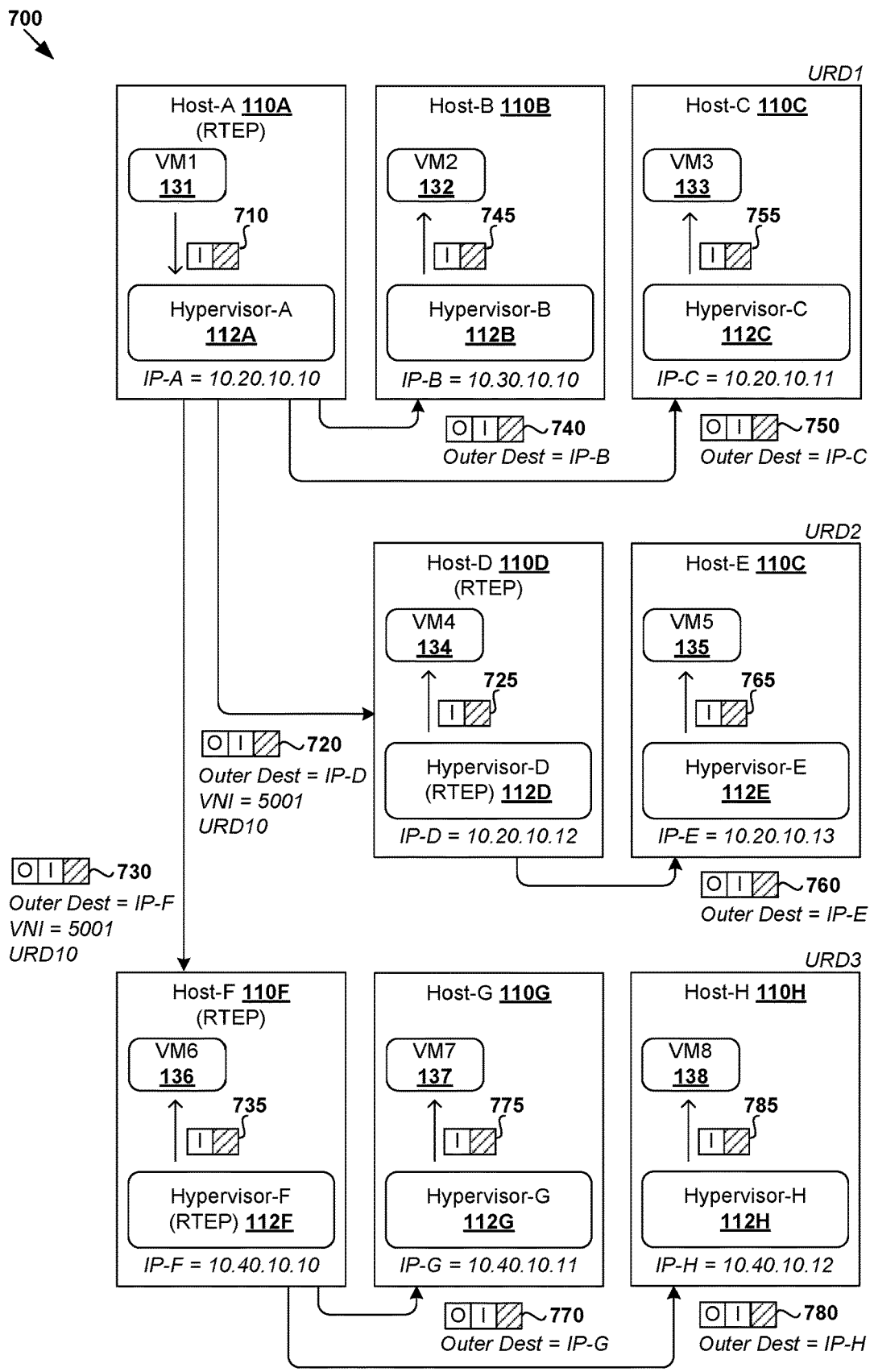
FIG. 7 is a schematic diagram illustrating example traffic replication in an SDN environment.

FIG. 6 is a flowchart of example detailed process 600 of traffic replication in SDN environment 100. Example process 600 may include one or more operations, functions, or actions illustrated at 605 to 698. The various operations, functions or actions may be combined into fewer blocks, divided into additional blocks, and/or eliminated depending on the desired implementation. The example in FIG. 6 will be discussed using FIG. 7 and FIG. 8. In particular, FIG. 7 is a schematic diagram illustrating example traffic replication 700 in SDN environment 100, and FIG. 8 is a schematic diagram illustrating example packets in FIG. 7.

In practice, example process 600 may be implemented using hosts 110A-H, such as using respective hypervisors 112A-H (or more particularly traffic replication module), etc. In the following, various examples will be explained using host-A 110A as a "first host," host-B 110B and host-C 110C as "second hosts," host-D 110D and host-F 110F as "third hosts," host-E 110E, host-G 110G and host-H 110H as "fourth hosts," and SDN controller 160 as a "network management entity." Traffic replication within replication domains 181-183 will be discussed in turn below.

(a) First Replication Domain: Host-A 110A

At 605, 610 and 615 in FIG. 6, in response to detecting egress packet 710 from VM1 131 located on VXLAN5001, source host-A 110A examines header information of packet 710 to determine whether replication is required. In the example in FIG. 7 and FIG. 8, egress packet 710 is a BUM packet that includes inner header 712 and payload 714. Inner header 712 includes source address information (source IP=IP-1, MAC=MAC-1) associated with VM1 131, and destination address information (destination IP=IP-BUM, MAC=MAC-BUM). Here, "MAC-BUM" represents a destination MAC address that corresponds to multiple recipients (i.e., broadcast or multicast) or an unknown recipient (i.e., unknown unicast).

In a broadcast scenario, packet 710 may be an address resolution request with MAC-BUM=FF:FF:FF:FF:FF:FF (i.e., broadcast MAC address). In IP-based networks, address resolution may be performed using Address Resolution Protocol (ARP) for IP version 4 (IPv4) addresses or Neighbor Discovery Protocol (NDP) for IP version 6 (IPv6) addresses. Depending on the address resolution protocol, packet 710 may be an ARP request (using ARP for IPv4), neighbor solicitation message (using NDP for IPv6), etc. In an unknown unicast scenario, packet 710 may be addressed to MAC-BUM that is unknown to host-A 110A, which causes packet 710 to be flooded on VXLAN5001.

In a multicast scenario, packet 710 may be a multicast packet with IP-BUM=IP-M (i.e., multicast group IP address) and MAC-BUM=MAC-M (i.e., multicast group MAC address). Multicasting may be implemented in SDN environment 100 to support the distribution of information from one or more sources (e.g., VM1 131) to a group of destinations (e.g., VM2 132 to VM8 138) simultaneously. In the example below, virtual machines 131-138 are members of the multicast group. If a particular host (e.g., host-H 110H) or replication domain does not support any multicast group member, it is not necessary to replicate packet 710 to the host or replication domain.

At 620, 625, 630 and 635 in FIG. 6, in response to determination that packet 710 needs to be replicated within another replication domain URDj, an encapsulated packet is generated and sent to each destination RTEPj associated with URDj. Here, notation URDj (j≠i) is used to indicate a different replication domain compared to URDi to which source host-A 110A is assigned. In this case, URDi may be referred to as a local or "source replication domain, while URDj as a remote or destination replication domain. Based on control information 500 in FIG. 5, host-A 110A in URD1 (i=1) identifies RTEPs supported by respective host-D 110D in URD2 (j=2) and host-F 110F in URD3 (j=3). As discussed using FIG. 4 and FIG. 5, the RTEPs may be selected by SDN controller 180 and/or host-A 110A.

In the example in FIG. 7 and FIG. 8, two encapsulated packets 720, 730 are generated and sent. Based on control information 540 associated with URD2 in FIG. 5, first encapsulated packet 720 is configured to include outer header 722 with destination address information (destination VTEP IP=IP-D, MAC=MAC-D) associated with the destination RTEP implemented by hypervisor-D 112D. Based on control information 560 associated with URD3 in FIG. 5, second encapsulated packet 730 is configured to include outer header 732 with (destination VTEP IP=IP-F, MAC=MAC-F) associated with the destination RTEP implemented by hypervisor-F 112F.

As shown in FIG. 8, outer header 722/732 also includes source address information (source VTEP IP=IP-A, MAC=MAC-A) associated with a source VTEP implemented by hypervisor-A 112A, information identifying the logical overlay network on which source VM1 131 is located (e.g., VNI=5001), and replication domain information 724/734 (e.g., ID=10 associated with URD1). In practice, the replication domain information 724/734 may identify URD1 (i.e., source replication domain) as shown. Alternatively or additionally, URD2 or URD3 (i.e., destination replication domain) may be included in outer header 722/732. Further, replicate flag=1 (see 726/736) is to indicate to the destination RTEPj that the packet is to be replicated within its replication domain URDj.

At 640, 645 and 650 in FIG. 6, an encapsulated packet is generated and sent to each destination VTEP associated with the local replication domain URDi (i.e., same replication domain as source host-A 110A). In the example in FIG. 7 and FIG. 8, two encapsulated packets 740, 750 are generated and sent based on control information 520/530 associated with URD1 in FIG. 5. Third encapsulated packet 740 includes outer header 742 that identifies (destination VTEP IP=IP-B, MAC=MAC-B) associated with the destination VTEP implemented by hypervisor-B 112B. Fourth encapsulated packet 750 includes outer header 752 that identifies (destination VTEP IP=IP-C, MAC=MAC-C) associated with the destination VTEP implemented by hypervisor-C 112C. Outer header 742/752 also includes (source VTEP IP=IP-A, MAC=MAC-A), logical overlay network information (e.g., VNI=5001), and replication domain information 744/754 (e.g., ID=10 associated with URD1). Since the destination VTEPs at respective host-B 110B and host-C 110C are not RTEPs, replicate flag=0 (see 746/756).

Since further replication is required within remote replication domains URDj (j≠i), host-A 110A may assign a higher priority to encapsulated packets 720, 730 compared to encapsulated packets 740, 750. In this case, encapsulated packets 720, 730 destined for respective host-D 110D in URD2 and host-F 110F in URD3 may be generated and sent before encapsulated packets 740, 750 destined for respective host-B 110B and host-C 110C in URD1. Depending on the capability of physical NICs 124A of host-A 110A, encapsulated packets 720-750 may be sent simultaneously.

As can be seen from the above examples, the scope of traffic replication at host-A 110A is limited to host-B 110B and host-C 110C in URD1, host-D 110D in URD2 and host-F 110F in URD3. Compared to conventional approaches that necessitate host-A 110A to replicate packet 710 to hosts 110B-H, the the number of encapsulated packets generated and sent by host-A 110A is significantly reduced. This in turn reduces the processing burden on host-A 110A, which may improve performance or at least reduce the adverse effect on other resource consumers at host-A 110A.

Further, compared to conventional approaches, examples of the present disclosure do not necessitate underlying physical network 105 (see FIG. 1) connecting hosts 110A-H to facilitate layer-3 multicast routing, such as using Internet Group Management Protocol (IGMP), Protocol Independent Multicast (PIM), etc. For example, although host-A 110A is located in a different subnet (i.e., 10.20.10.0/24) compared to host-F 110F, host-G 110G and host-H 110H (i.e., 10.40.10.0/24), it is not necessary to configure PIM and enable layer-3 multicast routing on router(s) connecting these hosts.

Instead, host-A 110A generates and sends encapsulated packet to host-F 110F in URD3 to cause host-F 110F to generate and send encapsulated packets 770, 780 to hosts 110G-H, respectively, within the same replication domain. As such, the implementation of replication domains provides more flexibility without any hardware requirement for multicast or limitation as to whether VTEPs in a particular URDi belong to the same layer-2 domain or subnet. In practice, it should be understood that hosts in the same subnet may be connected via layer-2 virtual private network (L2VPN), layer-3 VPN (L3VPN), etc.

(b) First Replication Domain: Host-B 110B and Host-C 110C

At 655, 660 and 665 in FIG. 6, in response to receiving encapsulated packet 740 from host-A 110A, host-B 110B performs decapsulation to remove outer header 742 before sending decapsulated packet 745 to VM2 132. Similarly, at host-C 110C, decapsulated packet 755 is sent to VM3 133. Referring also to FIG. 8, decapsulated packet 745/755 is the same as the packet 710 sent by source VM1 131.

(c) Second Replication Domain: Host-D 110D and Host-E 110E

At 670 and 675 in FIG. 6, in response to receiving encapsulated packet 720 from host-A 110A, host-D 110D determines that replication is required. For example, based on replication domain information (see 724) and/or replicate flag=1 (see 726) in outer header 722, it is determined encapsulated packet 720 originating from URD1 requires replication within URD2.

At 680 in FIG. 6, based on control information 550 associated with URD2 in FIG. 5, host-D 110D identifies a destination VTEP supported by host-E 110E that has been assigned to URD2. At 685 and 690, host-D 110D generates encapsulated packet 760 that is destined for host-E 110E. As shown in more detail in FIG. 7 and FIG. 8, encapsulated packet 760 includes outer header 762 that identifies (source VTEP IP=IP-D, MAC=MAC-D) and (destination VTEP IP=IP-E, MAC=MAC-E) associated with the destination VTEP implemented by hypervisor-E 112E. Outer header 762 further includes logical overlay network information (e.g., VNI=5001), replication domain information (see 764) and replicate flag=0 (see 766).

Further, at 695 in FIG. 6, host-D 110D generates and sends decapsulated packet 725 to destination VM4 134 located on VXLAN5001. At 696, 697 and 698, in response to receiving encapsulated packet 760 from host-D 110D, host-E 110E performs decapsulation and sends decapsulated packet 765 to destination VM5 135 located on VXLAN5001.

(d) Third Replication Domain: Host-F 110F, Host-G 110G and Host-H 110H

Similarly, host-F 110F performs blocks 670-690 to generate and send encapsulated packets 770, 780 to respective host-G 110G and host-H 110H within URD3. As shown in more detail in FIG. 7 and FIG. 8, encapsulated packet 770/780 includes outer header 772/782 with (source VTEP IP=IP-F, MAC=MAC-F), logical overlay network information (e.g., VNI=5001), replication domain information 774/784 and replicate flag=0 (see 776/786). After decapsulation, packets 735, 775, 785 are forwarded to respective VM6 136, VM7 137 and VM8 138 located on VXLAN5001.

Container Implementation

Although described using virtual machines 131-138, examples of the present disclosures may be implemented to perform traffic replication for other data compute nodes, such as containers supported by virtual machines 131-138. Some examples will be described using FIG. 9, which is a schematic diagram illustrating example traffic replication for a group of containers in SDN environment 100. In the example in FIG. 9, containers 901-908 may be executed as isolated processes inside respective virtual machines 131-138. As used herein, the term "container" (also known as "container instance") is used generally to describe an application that is encapsulated with all its dependencies (e.g., binaries, libraries, etc.).

Containers 901-908 are OS-less, meaning that they do not include any OS that could weigh 10s of Gigabytes (GB). This makes containers 901-908 more lightweight, portable, efficient and suitable for delivery into an isolated OS environment. Running containers inside a virtual machine (known as "containers-on-virtual-machine" approach) not only leverages the benefits of container technologies but also that of virtualization technologies. Containers 901-908 are located on the same logical overlay network (e.g., VXLAN5001) and are connected to logical switch 140 in FIG. 1 via respective logical ports (not shown for simplicity).

Figure 9:
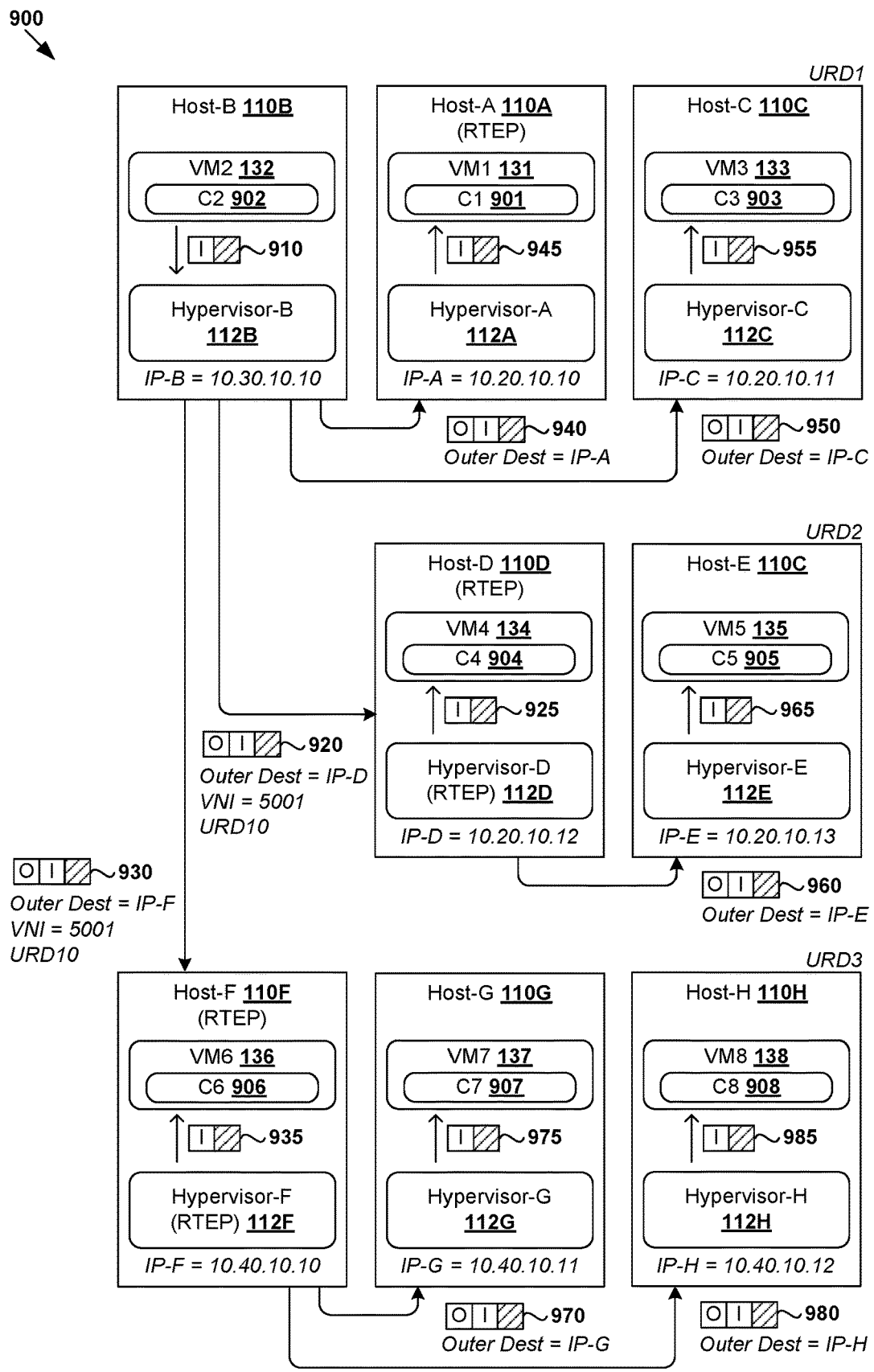
FIG. 9 is a schematic diagram illustrating example traffic replication for a group of containers in an SDN environment.

In the example in FIG. 9, consider a scenario where container C2 902 supported by VM2 132 on host-B 110B sends packet 910 that is addressed to IP-BUM and MAC-BUM. In this case, in response to detecting packet 910 and determination that replication is required, host-B 110B may perform blocks 606-635 in FIG. 6 to generate and send encapsulated packets 920, 930 to respective host-D 110D supporting a first RTEP for URD2, host-F 110F supporting a second RTEP for URD3. Further, according to blocks 640-650, host-B 110B generate and send encapsulated packets 940, 950 to respective host-A 110A and host-C 110C located within the same URD1. This in turn causes decapsulated packets 945, 955 to be generated and sent to respective C1 901 and C3 903 located on VXLAN5001.

At host-D 110D, replication is performed to generate and send encapsulated packet 960 to host-E 110E. Similarly, at host-F 110F, further replication is performed to generate and send encapsulated packets 970, 980 to respective host-G 110G and host-H 110H. This in turn causes decapsulated packets 925, 965, 935, 975, 985 to be generated and sent to respective C4 904, C5 905, C6 906, C7 907 and C8 908 located on VXLAN5001. See corresponding blocks 655-698 in FIG. 6. Depending on the desired implementation, it may not be necessary to send the decapsulated packets to the contrainers, such as in the case of ARP suppression for ARP requests, etc.

Computer System

The above examples can be implemented by hardware (including hardware logic circuitry), software or firmware or a combination thereof. The above examples may be implemented by any suitable computing device, computer system, etc. The computer system may include processor(s), memory unit(s) and physical NIC(s) that may communicate with each other via a communication bus, etc. The computer system may include a non-transitory computer-readable medium having stored thereon instructions or program code that, when executed by the processor, cause the processor to perform processes described herein with reference to FIG. 1 to FIG. 9. For example, a computer system capable of acting as a host may be deployed in SDN environment 100.

The techniques introduced above can be implemented in special-purpose hardwired circuitry, in software and/or firmware in conjunction with programmable circuitry, or in a combination thereof. Special-purpose hardwired circuitry may be in the form of, for example, one or more application-specific integrated circuits (ASICs), programmable logic devices (PLDs), field-programmable gate arrays (FPGAs), and others. The term 'processor' is to be interpreted broadly to include a processing unit, ASIC, logic unit, or programmable gate array etc.

The foregoing detailed description has set forth various embodiments of the devices and/or processes via the use of block diagrams, flowcharts, and/or examples. Insofar as such block diagrams, flowcharts, and/or examples contain one or more functions and/or operations, it will be understood by those within the art that each function and/or operation within such block diagrams, flowcharts, or examples can be implemented, individually and/or collectively, by a wide range of hardware, software, firmware, or any combination thereof.

Those skilled in the art will recognize that some aspects of the embodiments disclosed herein, in whole or in part, can be equivalently implemented in integrated circuits, as one or more computer programs running on one or more computers (e.g., as one or more programs running on one or more computing systems), as one or more programs running on one or more processors (e.g., as one or more programs running on one or more microprocessors), as firmware, or as virtually any combination thereof, and that designing the circuitry and/or writing the code for the software and or firmware would be well within the skill of one of skill in the art in light of this disclosure.

Software and/or to implement the techniques introduced here may be stored on a non-transitory computer-readable storage medium and may be executed by one or more general-purpose or special-purpose programmable microprocessors. A "computer-readable storage medium", as the term is used herein, includes any mechanism that provides (i.e., stores and/or transmits) information in a form accessible by a machine (e.g., a computer, network device, personal digital assistant (PDA), mobile device, manufacturing tool, any device with a set of one or more processors, etc.). A computer-readable storage medium may include recordable/non recordable media (e.g., read-only memory (ROM), random access memory (RAM), magnetic disk or optical storage media, flash memory devices, etc.).

The drawings are only illustrations of an example, wherein the units or procedure shown in the drawings are not necessarily essential for implementing the present disclosure. Those skilled in the art will understand that the units in the device in the examples can be arranged in the device in the examples as described, or can be alternatively located in one or more devices different from that in the examples. The units in the examples described can be combined into one module or further divided into a plurality of sub-units.

We claim:

1. A method for a first host to perform traffic replication in a software-defined networking (SDN) environment that includes the first host, a second host and a third host, wherein the method comprises:

obtaining control information that includes a first identifier associated with a first replication domain to which the first host and the second host are assigned, and a second identifier associated with a second replication domain to which the third host is assigned; and in response to detecting, from a virtualized computing instance, a packet that requires replication, based on the control information, generating a first encapsulated packet by encapsulating the packet with a first outer header that is addressed to the second host and includes the first identifier;

based on the control information, generating a second encapsulated packet by encapsulating the packet with a second outer header that is addressed to the third host and includes the first identifier or the second identifier; and sending the first encapsulated packet to the second host, and the second encapsulated packet to third host to cause the third host to perform replication within the second replication domain.

2. The method of claim 1, wherein generating the second encapsulated packet comprises:

configuring the second outer header of the second encapsulated packet to include a source virtual tunnel endpoint (VTEP) address associated with the first host and a destination VTEP address associated with the third host, wherein both the source VTEP address and the destination VTEP address are associated with a same subnet.

3. The method of claim 2, wherein generating the second encapsulated packet comprises:

configuring the second outer header of the second encapsulated packet to include a replicate flag that indicates to the third host that replication within the second replication domain is required, and an identifier associated with a logical overlay network on which the virtualized computing instance is located.

4. The method of claim 1, wherein generating the first encapsulated packet comprises:
configuring the first outer header of the first encapsulated packet to include a source VTEP address associated with the first host and a destination VTEP address associated with the second host, wherein both the source VTEP address and the destination VTEP address are associated with different subnets.

5. The method of claim 1, wherein obtaining the control information comprises:
receiving the control information from a network management entity that is configured to assign, based on an assignment policy, the first host and the second host to the first replication domain and the third host to the second replication domain.

6. The method of claim 1, wherein sending the first encapsulated packet and the second encapsulated packet comprises:
assigning a higher priority to the second encapsulated packet compared to the first encapsulated packet by sending the second encapsulated packet to the third host prior to sending the first encapsulated packet to the second host.

7. The method of claim 1, wherein the method further comprises:
determining that the packet requires replication based on an inner header of the packet that is addressed to a destination address associated with multiple recipients, or an unknown recipient.

8. A non-transitory computer-readable storage medium that includes a set of instructions which, in response to execution by a processor of a first host, cause the processor to perform a method of traffic replication in a software-defined networking (SDN) environment that includes the first host, a second host and a third host, wherein the method comprises:
obtaining control information that includes a first identifier associated with a first replication domain to which the first host and the second host are assigned, and a second identifier associated with a second replication domain to which the third host is assigned; and
in response to detecting, from a virtualized computing instance, a packet that requires replication,
based on the control information, generating a first encapsulated packet by encapsulating the packet with a first outer header that is addressed to the second host and includes the first identifier;
based on the control information, generating a second encapsulated packet by encapsulating the packet with a second outer header that is addressed to the third host and includes the first identifier or the second identifier; and
sending the first encapsulated packet to the second host, and the second encapsulated packet to third host to cause the third host to perform replication within the second replication domain.

9. The non-transitory computer-readable storage medium of claim 8, wherein generating the second encapsulated packet comprises:
configuring the second outer header of the second encapsulated packet to include a source virtual tunnel endpoint (VTEP) address associated with the first host and a destination VTEP address associated with the third host, wherein both the source VTEP address and the destination VTEP address are associated with a same subnet.

10. The non-transitory computer-readable storage medium of claim 9, wherein generating the second encapsulated packet comprises:
configuring the second outer header of the second encapsulated packet to include a replicate flag that indicates to the third host that replication within the second replication domain is required, and an identifier associated with a logical overlay network on which the virtualized computing instance is located.

11. The non-transitory computer-readable storage medium of claim 8, wherein generating the first encapsulated packet comprises:
configuring the first outer header of the first encapsulated packet to include a source VTEP address associated with the first host and a destination VTEP address associated with the second host, wherein both the source VTEP address and the destination VTEP address are associated with different subnets.

12. The non-transitory computer-readable storage medium of claim 8, wherein obtaining the control information comprises:
receiving the control information from a network management entity that is configured to assign, based on an assignment policy, the first host and the second host to the first replication domain and the third host to the second replication domain.

13. The non-transitory computer-readable storage medium of claim 8, wherein sending the first encapsulated packet and the second encapsulated packet comprises:
assigning a higher priority to the second encapsulated packet compared to the first encapsulated packet by sending the second encapsulated packet to the third host prior to sending the first encapsulated packet to the second host.

14. The non-transitory computer-readable storage medium of claim 8, wherein the method further comprises:
determining that the packet requires replication based on an inner header of the packet that is addressed to a destination address associated with multiple recipients, or an unknown recipient.

15. A first host configured to perform traffic replication in a software-defined networking (SDN) environment that includes the first host, a second host and a third host, wherein the first host comprises:
a processor; and
a non-transitory computer-readable medium having stored thereon instructions that, when executed by the processor, cause the processor, and perform the following:
obtain control information that includes a first identifier associated with a first replication domain to which the first host and the second host are assigned, and a second identifier associated with a second replication domain to which the third host is assigned; and
in response to detecting, from a virtualized computing instance, a packet that requires replication,
based on the control information, generate a first encapsulated packet by encapsulating the packet with a first outer header that is addressed to the second host and includes the first identifier;
based on the control information, generate a second encapsulated packet by encapsulating the packet with a second outer header that is addressed to the third host and includes the first identifier or the second identifier; and
send the first encapsulated packet to the second host, and the second encapsulated packet to third host to cause the third host to perform replication within the second replication domain.

16. The first host of claim 15, wherein the instructions for generating the second encapsulated packet cause the processor to:
configure the second outer header of the second encapsulated packet to include a source virtual tunnel endpoint (VTEP) address associated with the first host and a destination VTEP address associated with the third host, wherein both the source VTEP address and the destination VTEP address are associated with a same subnet.

17. The first host of claim 16, wherein the instructions for generating the second encapsulated packet cause the processor to:
configure the second outer header of the second encapsulated packet to include a replicate flag that indicates to the third host that replication within the second replication domain is required, and an identifier associated with a logical overlay network on which the virtualized computing instance is located.

18. The first host of claim 15, wherein the instructions for generating the first encapsulated packet cause the processor to:
configure the first outer header of the first encapsulated packet to include a source VTEP address associated with the first host and a destination VTEP address associated with the second host, wherein both the source VTEP address and the destination VTEP address are associated with different subnets.

19. The first host of claim 15, wherein the instructions for obtaining the control information cause the processor to:
receive the control information from a network management entity that is configured to assign the first host and the second host to the first replication domain and the third host to the second replication domain based on an assignment policy.

20. The first host of claim 15, wherein the instructions for sending the first encapsulated packet and the second encapsulated packet cause the processor to:
assign a higher priority to the second encapsulated packet compared to the first encapsulated packet by sending the second encapsulated packet to the third host prior to sending the first encapsulated packet to the second host.

21. The first host of claim 15, wherein the instructions further cause the processor to:
determine that the packet requires replication based on an inner header of the packet that is addressed to a destination address associated with multiple recipients, or an unknown recipient.

\* \* \* \* \*